United States Patent

Knudsen et al.

[11] 3,978,194
[45] Aug. 31, 1976

[54] PRODUCTION OF SIZED PARTICLES OF URANIUM OXIDES AND URANIUM OXYFLUORIDES

[75] Inventors: Irving E. Knudsen, Murrysville; Clinton C. Randall, Pittsburgh, both of Pa.

[73] Assignee: Westinghouse Electric Corporation, Pittsburgh, Pa.

[22] Filed: June 21, 1971

[21] Appl. No.: 155,079

[52] U.S. Cl. .............................. 423/261; 23/284; 252/301.1 R; 423/253; 423/260
[51] Int. Cl.² .................................... C01G 43/02
[58] Field of Search ................. 423/253, 261, 260; 252/301.1 R; 23/284

[56] References Cited
UNITED STATES PATENTS

| | | | |
|---|---|---|---|
| 3,160,471 | 12/1964 | Knudsen et al. | 423/261 |
| 3,168,369 | 2/1965 | Reese et al. | 423/261 X |
| 3,260,575 | 7/1966 | Heestand et al. | 423/261 |
| 3,297,411 | 1/1967 | Dear | 23/284 |
| 3,547,598 | 12/1970 | Knudsen | 423/261 |
| 3,765,844 | 10/1973 | Rode | 423/261 X |

OTHER PUBLICATIONS
Perry, Chemical Engineers' Handbook, 3rd Ed., pp. 1453–1454, McGraw–Hill Book Company, Inc. (1950), New York.

*Primary Examiner*—Benjamin R. Padgett
*Assistant Examiner*—E. A. Miller Miller
*Attorney, Agent, or Firm*—R. T. Randig

[57] ABSTRACT

A process for converting uranium hexafluoride ($UF_6$) to uranium dioxide ($UO_2$) of a relatively large particle size in a fluidized bed reactor by mixing uranium hexafluoride with a mixture of steam and hydrogen and by preliminary reacting in an ejector gaseous uranium hexafluoride with steam and hydrogen to form a mixture of uranium and oxide and uranium oxyfluoride seed particles of varying sizes, separating the larger particles from the smaller particles in a cyclone separator, recycling the smaller seed particles through the ejector to increase their size, and introducing the larger seed particles from the cyclone separator into a fluidized bed reactor where the seed particles serve as nuclei on which coarser particles of uranium dioxide are formed.

9 Claims, 2 Drawing Figures

PRODUCTION OF SIZED PARTICLES OF URANIUM OXIDES AND URANIUM OXYFLUORIDES

BACKGROUND OF THE INVENTION

1. Field of the Invention:

This invention relates to the production of ceramic-grade uranium dioxide powder, and more particularly it pertains to the alternate conversion of uranium hexafluoride to uranium dioxide particles of controlled size by the initial production of seed particles of suitable size of uranium dioxide or intermediate reaction product (uranium oxides and oxyfluorides), for introduction into a fluidized bed reactor where the seed particles serve as substrates on which the deposition of uranium dioxide may be carried out to produce particles of $UO_2$ of the desired size.

2. Description of the Prior Art:

In a fluidized bed chemical reaction system, such as disclosed in U.S. Pat. No. 3,547,598, gas-phase chemical reactions between uranium hexafluoride, steam and hydrogen are carried out within a fluidized bed of solid particulates and the solid product of the reaction forms as accretions on the fluidized particulates. The solid product, uranium oxide and oxyfluoride particles, is withdrawn either continuously or intermittently from the lower end of the fluidized bed in a first reactor and converted further in a second reactor.

It has become a practice to initiate production in such a system by charging it with an initial starting bed of substrate material of substantially the same enrichment composition as the ultimate reaction product. Usually the substrate material is provided from retained inventory of prior production runs, or by providing an inert substrate and rejecting the product produced in the early portion of a production period until the inert bearing substrate has been purged from the system. Both of these procedures incur economic penalties. Moreover, prior attempts to generate the necessary substrate in the reactor by gas-phase reaction without an initial starting bed have failed because the gas-phase reaction without the presence of a substrate yields a solid product of a small particle size which is lost from the reactor by elutriation, or if retained, fails to have adequate fluidization characteristics.

SUMMARY OF THE INVENTION

Generally, the process of the present invention involves the provision of means for the production of uranium oxide and oxyfluoride particles of the requisite size for introduction into a fluidized bed reactor preliminary to or during the start-up of the reactor. The particles of uranium oxide and oxyfluoride, having a selected minimum particle size, serve as seed or nuclei on which additional uranium oxide compounds are grown, thereby facilitating the chemical reaction system within the fluidized bed reactor. The means for producing the uranium oxide and oxyfluoride particles of the requisite size preferably includes an ejector in which gaseous reactants including super-heated steam, hydrogen, and volatilized uranium hexafluoride, are mixed to produce solid particles of uranium oxide and oxyfluoride. Inasmuch as the initial size of the particles is too small to serve as seed particles within a fluidized bed reactor, the particles emitted from the ejector are recycled or recirculated through the ejector in order to increase their particle size until they are sufficiently large for use as seed or nuclei in the fluidized bed reactor. A satisfactory means for separating the small and large particles in the ejector system is a cyclone separator, the larger particles of desired seed size are conveyed to the fluidized bed reactor, while the fines are recirculated through the ejector to enable growth thereof.

The advantage of the process and suitable apparatus for carrying out the process is a definite increase in economy of the fluidized bed reactor. During the startup of operation of a fluidized bed substrate reactor, the present invention has found it feasible to initiate rapidly and satisfactorily the production of controlled sized $UO_2$ particles in the system and thereby it significantly enhances the economics of the overall system.

BRIEF DESCRIPTION OF THE DRAWING

For a better understanding of the invention, reference is made to the accompanying drawing in which.

DESCRIPTION OF THE PREFERRED EMBODIMENT

Figure 1:
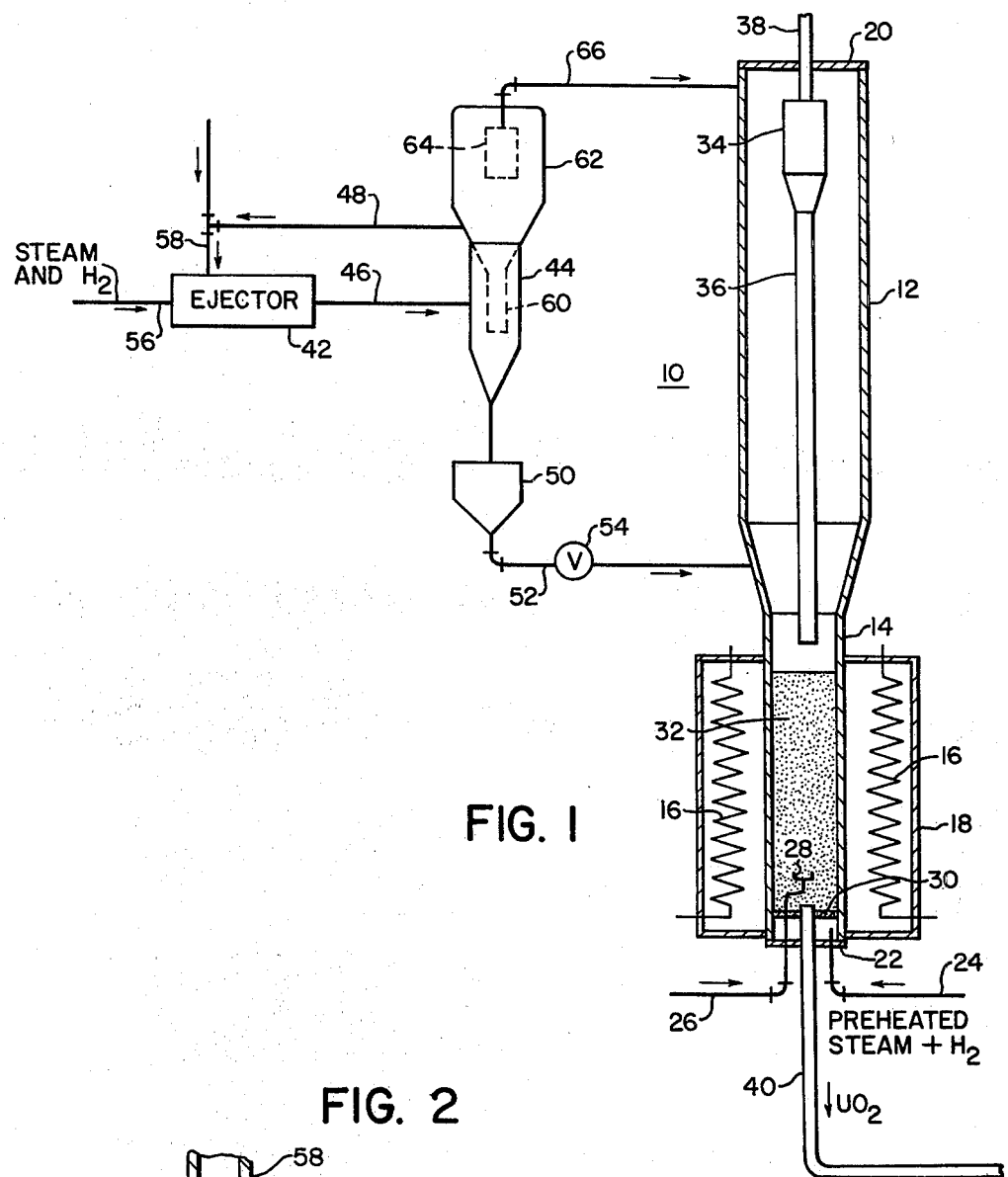
FIG. 1 is a schematic partly in cross-section view of a fluidized bed reactor having means including an ejector and cyclone separator for producing and recirculating particles of uranium compounds and for separating and withdrawing particles of requisite initial size for introduction into the fluidized bed reactor, and the ultimate production of $UO_2$ particles of a controlled large size.

Generally, the process of converting uranium hexafluoride to uranium dioxide in the presence of steam and hydrogen is carried out in one or more fluidized bed reactors where at temperatures of from 475° to 650°C. the following reactions take place:

$$UF_6 + 2H_2O \rightarrow UO_2F_2 + 4HF \quad (1)$$
$$3UO_2F_2 + 3H_2O \rightarrow U_3O_8 + 6HF + \tfrac{1}{2}O_2 \quad (2)$$
$$UO_2F_2 + H_2 \rightarrow UO_2 + 2HF \quad (3)$$
$$U_3O_8 + 2H_2 \rightarrow 3UO_2 + 2H_2O \quad (4)$$

Usually where two or more fluidized bed reactors are used in series, a temperature range of 475° to 600°C. is maintained in the first reactor whereby the reactions 1, 2, and 3 predominate in the conversion process. Thereafter the three uranium oxide compounds are conveyed to a second reactor where in the presence of steam and hydrogen at temperatures of 540° to 650°C. reaction 4 occurs.

While reaction 4 may take place to a limited extent in the first reactor, however, in the second fluidized bed reactions 2, 3, and 4 predominate and result in essentially stoichiometric production of $UO_2$ from $UF_6$ as particles of up to about 1,000 microns in diameter, having a bulk density about 3 grams per cc. and a BET surface area of from 1 to 2 m² per gram for the −45 to +60 mesh particle fraction (i.e., the particles pass a 45 mesh screen but are retained on a 60 mesh screen). The BET test is a standard procedure based on nitrogen absorption to measure the surface area of a powder.

As shown in FIG. 1, a first fluidized bed reactor is generally indicated at 10 and it is understood that this reactor may function either separately or in conjunction with one or more additional reactors in a manner similar to that disclosed in U.S. Pat. No. 3,547,598.

The reactor 10 is a tubular structure having a vertical axis and preferably having an upper portion 12 and a lower portion 14, the upper portion may have a larger diameter than the lower portion. The lower portion is enclosed within heating means as, for example, electric resistance elements 16 within a housing 18. The upper end of the reactor 10 is closed by a cover 20, and the lower end is closed by a cover 22, which covers are preferably detachably mounted in a manner not shown.

The reactor 10 has an inlet 24 for introducing preheated steam and hydrogen at the bottom end of the lower portion 14. Similarly, a conduit 26 is provided to introduce uranium hexafluoride ($UF_6$) into the lower portion 14 of the reactor 10. For that purpose, the conduit 26 extends through the cover 22 and has an inner end portion provided with a gas distribution nozzle 28. The nozzle 28 also is disposed above a perforated distribution plate 30 for supporting a fluidized bed 32 composed of particles of a mixture of uranyl fluoride ($UO_2F_2$) and uranium oxide ($UO_2$) which must be present prior to and during the start-up of the fluidized bed reaction.

In addition, means, such as a cyclone separator 34, are provided within the upper end of the reactor 10 for separating coarser particles of reaction product from the finer particles which are suspended in gases occupying the upper portion of the reactor. This is accomplished by a rapid spiral movement of the ascending gas particle stream from conduit 36 as it enters the enlarged separator 34. The coarser particles caught in the cyclone separator fall and are returned to the lower reactor portion 14 through conduit 36. An exhaust 38 from the separator 34 carries the fine $UO_2$ particles through a suitable transfer system and introduces the fine particles into a second reactor, as shown in U.S. Pat. No. 3,547,598. The reactor 10 is also provided with a product outlet conduit 40, whereby the larger uranium oxide and oxyfluoride particles are withdrawn from the bottom of reactor portion 14 in a conventional manner.

In accordance with the present invention, the foregoing fluidized bed reactor 10 is provided with means for generating seed particles to be employed as the fluidized bed 32 for carrying out the reaction in the reactor 10. Although the means for generating the solid seed particles from raw gas may include any suitable reactor in which mixtures of steam, hydrogen, and volatilized uranium hexafluoride are mixed, it has been found that satisfactory results are obtained by the use of an eductor or ejector 42, a separator 44, as well as interconnecting pipes 46 and 48 therebetween. A feed hopper 50 is preferably provided at the outlet end of the separator 44 for storing seed particles. A conduit 52 having a valve 54 extends between the lower end of the hopper 50 and communicates with the interior of the reactor 10.

Figure 2:
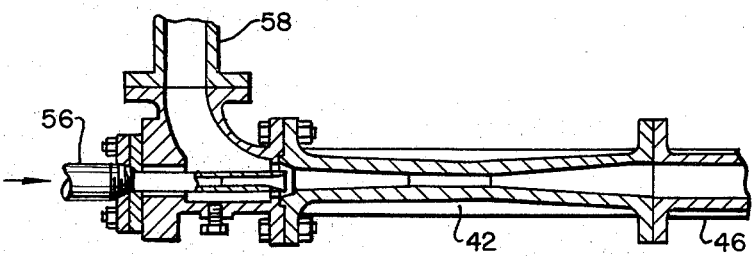
FIG. 2 is a cross-sectional view of an ejector.

The ejector 42 may be any conventional type of ejector such as shown in "Mechanical Engineers' Handbook" by Lionel S. Mark, fifth edition, McGraw-Hill Book Co., 1951 at page 1832, or as shown in "Chemical Engineers' Handbook", John H. Perry, fourth edition, McGraw-Hill Book Co., 1963 at page 6–29. The ejector, which is sometimes called an eductor, is a special type of jet pump commonly operated by steam. As shown in FIG. 2, the ejector 42 is provided with an inlet 56 for introducing a jet by steam and hydrogen, as well as an inlet 58 for the introduction of volatile $UF_6$. Initially, the gaseous reactants including steam, hydrogen, and $UF_6$ are intermixed within the ejector and react to form particles of $UO_2$, $UO_2F_2$, $U_3O_8$, and mixtures thereof of varying sizes, such as from submicron diameters up to about 2 micron in diameter.

Various reactions such as the reactions 1, 2, 3, and 4, as set forth above, occur in the ejector during the admixing of the reactants. For that purpose the temperature is above the dew point of the mixture, above about 150°C. Sufficient flow of steam and hydrogen from conduit 56 is used to induce a suction on the inlet 58 for drawing vaporized $UF_6$ into the ejector from a source (not shown). For that purpose, $UF_6$ is heated to above its sublimation point of about 56°C.

The mixture of the reactants is generally based on mole ratios providing a surplus of steam and hydrogen for the $UF_6$ conversion. For example, for each mole of $UF_6$ from 2 to 8 moles of steam and from 1 to 8 moles of hydrogen are used.

Inasmuch as the particles of the uranium compounds when initially formed in the ejector 42 have a maximum particle size of about 2 microns, they are recirculated many times through the ejector 42, the pipe 46, the separator 44, and the pipe 48 and they grow each time until they are large enough to be centrifugally separated from the recirculation gas stream. Initially almost all of the particles are recycled through the ejector. As they enter the cyclone separator 44 the finer particles are suspended in the gas and are drawn upwardly through an exhaust conduit 60 into an upper portion 62 of the separator 44. Due to a pressure difference between the upper portion 62 and the ejector inlet 58, the suspended particles with some gases reenter the ejector along with raw gaseous $UF_6$. The finer particles or fines are drawn out of the separator leaving most of the gaseous reaction products and excess reactants to be withdrawn from the separator through a filter 64 where the solid reaction products such as $UO_2$, $U_3O_8$ and $UO_2F_2$ cannot pass and are retained. Those filtered gaseous products in turn are transmitted via a conduit 66 to the upper portion of the reactor 10 where they travel downwardly and react further with any bed particles and from where the gases depleted of uranium enter conduit 36 and are ultimately withdrawn through the exhaust 38.

During recycling of the particles in ejector 42 the $U_3O_8$ and $UO_2F_2$ are partially converted to $UO_2$ due to their contact with hot raw steam and hydrogen. At the same time, the particles grow in size by accretion until they reach a size varying of from about 50 to about 300 microns. In that size range they are sufficiently large to be withdrawn from the gas stream and collected in the cyclone separator 44 and no longer pass into the upper portion 62 thereof. From the separator 44 these larger particles of $UO_2F_2$ together with a minor amount of other reaction products such as $U_3O_8$ and $UO_2$ drop into the feed hopper 50 where they collect until needed in the reactor 10.

Inasmuch as the seed particles are required only to facilitate the production of the uranium compounds on a larger scale in the reactor 10, only a sufficient amount of seed particles are accumulated in the feed hopper 50 from where they are discharged to the conduit 52 by the valve 54 into the lower portion 14 of the reactor 10. Once an adequate bed of seed particles is accumulated within the reactor 10, the seed particles provide nuclei or solid substrate surfaces on which $UO_2$, $UO_2F_2$, and $U_3O_8$ generated within the reactor 10 deposit and the particles grow. The average size of the $UO_2$ particles produced in the reactor 10 and leaving the reactor through the conduit 40 is of the order of 250 microns and may reach about 1000 micron diameter.

The following example is illustrative of this invention:

EXAMPLE

The reaction of $UF_6$, steam, and $H_2$ proceeds in the vapor phase with about 5 moles of steam and 4 moles of hydrogen for each mole of $UF_6$ in an ejector, such as that shown in FIG. 2 of the drawing, at a temperature of about 160°C. The solid product of the initial reaction is of extremely small particle size for which reason it is precluded from use directly as a necessary substrate in the direct conversion fluidized bed (DCFB) process. A cyclone separator 44 is constructed so as to separate particles equal to or greater than a predetermined size such as about 100 microns, a usable range being from 50 to 300 microns in diameter, as seed particles for fluidized bed reactor. Accordingly, the very fine particles of the initial reaction product leave the separator in the gas discharge and enter the upper portion or filter chamber from where they are recycled with a part of the gas stream to the reaction zone in 42 via the recycle line 48. Recycle is primarily induced by the ejector because of the suction on the $UF_6$ inlet produced by the jet of steam and hydrogen entering from line 56.

Excess reaction product gases, such as HF, $H_2$, $O_2$ and steam are discharged via porous metal filters 64 into the fluidized bed reaction chamber. The fine particles of the solid reaction products are retained and recycled through ejector 42 a number of times. As the particles recycle they grow to a predetermined desired size by additional deposition of solids therein in the reaction chamber and ultimately reach a size so great that rapid spiral movement in cyclone 44 throws them out of the gas stream against the walls 44 where they slide down and are discharged from the bottom of the cyclone separator to the storage tank 50, and then conveyed to the fluidized bed reactor by operating valve 54 in conduit 52.

Accordingly, a method for producing seed beds of particles of suitable fluidization and chemical characteristics is provided by inducing recycling of fine solid reaction products of uranium oxide from a gas-phase reaction through the reaction zone until suitable particle size is obtained. The system includes a method of continuously separating the product of the reaction zone into two fractions, a fine fraction for recycle and a coarser fraction of a desired size for use as a starting bed.

What is claimed is:

1. In a process for converting uranium hexafluoride to produce a supply of uranium dioxide and $UO_2F_2$ seed particles of a selected size for use as the bed in a fluidized bed reactor, the steps comprising
    a. preliminarily reacting uranium hexafluoride with steam and hydrogen in a reaction zone to form gaseous reaction products and solid reaction products to produce varying sized seed particles of uranium oxides and oxyfluorides, the solid reaction products and the reacting gases concurrently flowing through the reaction zone,
    b. continuously separating the gaseous reaction products from the seed particles, as well as the smaller particles from selected larger sized particles,
    c. recycling the smaller seed particles by flowing them through the reaction zone with added subsequent mixtures of steam, hydrogen and uranium hexafluoride to grow the smaller particles into larger seed particles,
    d. introducing the separated larger seed particles into a fluidized bed reactor, whereby they provide an initial fluidized bed of nuclei on which continued formation of solid uranium oxide compounds occurs, and
    e. once a fluidized bed has been provided, terminating the preliminary reacting of $UF_6$, steam and hydrogen in step (a).

2. The process of claim 1 wherein the seed particles uranium compounds are recycled repeatedly until they attain a particle size of at least about 50 microns.

3. The process of claim 1 wherein the larger seed particles of a diameter ranging from about 50 to 300 microns are separated from the mixture of particles of varying size by cyclonic separation of the mixture, whereby only the larger seed particles are available for step (d) and the smaller seed particles are recycled.

4. The process of claim 1 wherein the recycled fine particle solid reaction products are injected along with $UF_6$ into a moving stream of mixture of steam and hydrogen in step (a).

5. The process of claim 1 wherein the mixture consists essentially of uranium hexafluoride, steam and hydrogen in the proportion of 1 mole: 2 to 8 moles: 1 to 8 moles.

6. The process of claim 1 wherein the temperature of the mixture of $UF_6$, steam, and hydrogen in step (a) is above the dew point of the mixture.

7. The process of claim 1 wherein the preliminary reaction between uranium hexafluoride with steam and hydrogen to form seed particles of uranium compound occurs in an ejector in which a jet of steam and hydrogen draws in uranium hexafluoride gas and admixes and reacts therewith.

8. The process of claim 7 wherein the separation of gaseous reaction products from said seed particles occurs in a cyclone separator from which fine seed particles are recycled to the ejector, and the larger seed particles above a selected diameter are discharged.

9. A process for converting uranium hexafluoride to uranium dioxide in a fluidized bed reactor, comprising the steps of preliminarily reacting with each mole of $UF_6$, 2 to 8 moles of steam and 1 to 8 moles of hydrogen in an ejector to form gaseous reaction products and solid reaction products including seed particles of varying sizes of uranium oxides and oxyfluorides; separating the gaseous reaction products from the seed particles as well as separating the smaller particles from the larger particles by rapid spiral movement of the mixture; recycling the smaller seed particles through the ejector with added subsequent mixtures of steam, hydrogen, and $UF_6$, to grow them into larger seed particles of at least about 50 microns, introducing the separated, larger seed particles into a fluidized bed reactor, and reacting the larger seed particles with steam, $UF_6$ and hydrogen in the fluidized bed reactor to convert any oxyfluorides to $UO_2$, and to apply more $UO_2$ to the seed particles.

* * * * *